United States Patent

[11] 3,609,137

[72] Inventors Hans Georg Menssen
  Geyen, Manstedtener;
  Hans Honerlagen, Frankfurt-Praunheim,
  both of Germany
[21] Appl. No. 827,141
[22] Filed May 23, 1969
[45] Patented Sept. 28, 1971
[73] Assignee A. Nattermann & Cie GmbH
  Braunsfeld, Germany
[32] Priority May 31, 1968
[33] Austria
[31] A 5230/68

[54] PROCESS FOR THE PRODUCTION OF AN AESCIN-RICH CONCENTRATE OF ACTIVE MATERIAL FROM HORSE-CHESTNUT SEEDS
2 Claims, No Drawings
[52] U.S. Cl.................................................. 260/210.5

[51] Int. Cl.................................................. C07c 173/00
[50] Field of Search........................................ 260/210.5

[56] References Cited
UNITED STATES PATENTS

| | | | |
|---|---|---|---|
| 2,823,204 | 2/1958 | Janot et al. | 260/210.5 |
| 2,895,953 | 7/1959 | Wall et al. | 260/210.5 |
| 3,151,108 | 9/1964 | Bosse et al. | 260/210.5 |

*Primary Examiner*—Lewis Gotts
*Assistant Examiner*—Johnnie R. Brown
*Attorney*—Karl W. Flocks

ABSTRACT: An aescin-rich concentrate is obtained from horse chestnuts by comminutating the horse chestnuts, then extracting with acidified water for 1 to 2 hours and discarding the first extract, then again extracting the pretreated horse chestnuts using a low molecular weight alcohol, ketone or aqueous alcohol ketone, and finally drying the second extract.

PROCESS FOR THE PRODUCTION OF AN AESCIN-RICH CONCENTRATE OF ACTIVE MATERIAL FROM HORSE-CHESTNUT SEEDS

Horse-chestnut seeds and their extracts have long been employed in therapy owing to their aescin content. For oral application, they are used in the form of aqueous alcoholic extracts or as dry extracts.

The aescin content of horse-chestnut seeds is about 5–6 percent. The aescin content of dry extracts obtained by most of the hitherto known processes is between 15 percent and 20 percent. It is also known to extract horse-chestnut seeds, which have already been freed of fat, with pure water, aqueous alcohol or anhydrous methanol and thereafter to reextract the dry extracts obtained from these extracts, in the presence of water with 1,2-propylene-glycol, 1,3-butylene-glycol or glycerin or mixtures of these solvents with chloroform or methylene chloride (DAS 1,182,385; British Pat. 991,663). It is stated that dry extracts containing at most 25 percent aescin can be obtained by these processes, these results having been confirmed by working in accordance with the particulars of these processes.

An object of the present invention is to provide an extremely simple method of producing extracts which have a substantially higher aescin concentration than the hitherto known commercial extracts.

It has now been surprisingly found that it is thereby possible to obtain such relatively highly concentrated extracts in accordance with the invention by extracting the comminuted, husked or unhusked horse-chestnut seeds, which have not been freed from fat, with acidified water for 1 to 2 hours at room temperature, thereafter again extracting the pretreated seeds by means of low molecular weight alcohols, ketones or aqueous alcohols or aqueous ketones, and then drying the second extract in a known manner. Dilute aqueous solutions of organic acids, more especially 2 percent acetic acid or formic acid, have proved particularly suitable for the initial extraction. For the extraction of the aescin and of the other active substances from the pretreated seeds, 70–90 percent methanol is particularly suitable; especially 80 percent methanol is very suitable.

The dry extracts obtained by this process have an aescin content between 40 percent and 50 percent and contain at the same time, in addition to the main active substance aescin, the remaining desired extractable substances of the chestnut. The concentrated dry extract may be employed in the form of capsules, sugar-coated pills, or dragees, ointments or suppositories.

The procedure is very simple because the chestnut seeds need not be first freed from fat. After the treatment with the aqueous acid, the seeds may then be extracted with the alcohol or ketone or the aqueous mixtures thereof, without intermediate drying, it being possible for the extraction to take place at room temperature. The particular advantage of the methanol-water mixture resides in that only a few fats or oils are thereby dissolved out of the seeds, so that the latter do not first have to be freed from fat.

The concentration of the extract of active substance takes place in the usual manner, preferably under careful conditions and with final vacuum drying.

The following example will serve, without limitation, as a further illustration of the invention:

EXAMPLE 1

500 grams of commercial unhusked horse-chestnut seeds (having an average aescin content of 5.45 percent) are coarsely comminuted and extracted with 2 percent acetic acid with stirring at room temperature for 1½ hours. After this time, the extraction liquid is separated from the drug material and discarded. The drug thus pretreated is extracted with 5 liters of 80 percent methanol with stirring at room temperature for 3½ hours. After completion of the extraction, the extract is concentrated in vacuo under moderate conditions, and the concentrated dry extract is thereafter obtained therefrom in a known manner.

In accordance with this example, there are obtained 28 grams of concentrate of active substance having a 49 percent aescin content. The aescin yield is 50.3 percent of the theory.

EXAMPLE 2

500 grams of commercial unhusked horse-chestnut seeds (having an average aescin content of 5.45 percent) are coarsely comminuted and extracted with 2 percent acetic acid with stirring at room temperature for 1½ hours. After this time, the extraction liquid is separated from the drug material and discarded. The drug thus pretreated is extracted without intermediate drying with 5 liters of 70 percent isopropanol with stirring at room temperature for 3½ hours. After completion of the extraction the extract is concentrated in vacuo under moderate conditions and the concentrated dry extract is thereafter obtained therefrom in a known manner.

In accordance with this example there are obtained 36.5 grams of concentrate of active substance having a 41.2 percent aescin content. The aescin yield is 55.15 percent of the starting material.

EXAMPLE 3

500 grams of commercial unhusked horse-chestnut seeds (having an average aescin content of 5.45 percent are coarsely comminuted and extracted with 2 percent acetic acid with stirring at room temperature for 1½ hours. After this time, the extraction liquid is separated from the drug material and discarded. The drug thus pretreated is extracted without intermediate drying with 5 liters of 70 percent acetone with stirring at room temperature for 3½ hours. After completion of the extraction the exact is concentrated in vacuo under moderate conditions and the concentrated dry extract is thereafter obtained therefrom in a known manner.

In accordance with this example, there are obtained 36.75 g. of concentrate of active substance having a 40.3 percent aescin content. The aescin yield is 54.3 percent of the starting material.

It will be obvious to those skilled in the art that various changes may be made without departing from the scope of the invention and the invention is not to be considered limited to what is described in the specification.

What is claimed is:

1. A process for the production of an aescin-rich concentrate of active material by extraction of horse-chestnut seeds with organic solvents comprising comminuting horse-chestnut seeds which have not been freed from fat; initially extracting the seeds with weak acetic or formic acid at a concentration of about 2 percent at room temperature for 1 to 2 hours and discarding the extraction fluid; then extracting the pretreated seeds with 70–90 percent of low molecular weight alcohol or of acetone; and drying the second extract to obtain the aescin-rich concentrate.

2. Process according to claim 1 wherein the pretreated seeds are extracted with 80 percent methanol.